May 14, 1929. A. E. WILLIS 1,712,802

DEVICE FOR GRINDING COOKED VEGETABLES

Filed May 12, 1927

Inventor:
Arthur E. Willis

Patented May 14, 1929.

1,712,802

UNITED STATES PATENT OFFICE.

ARTHUR EDWIN WILLIS, OF SOUTH BEND, INDIANA.

DEVICE FOR GRINDING COOKED VEGETABLES.

Application filed May 12, 1927. Serial No. 190,816.

The invention relates to a device used for grinding cooked vegetables to a pulp very quickly and the object is, first, to replace the present difficult and wasteful method of forcing the cooked food through an ordinary wire strainer with a spoon, a custom now generally prevailing in preparing foods for babies during the early feeding months; and, second, to provide a simple and quickly operated utensil for housewives to reduce cooked vegetables to a fine pulp for use in gravies, sauces and the like.

Figure 1:
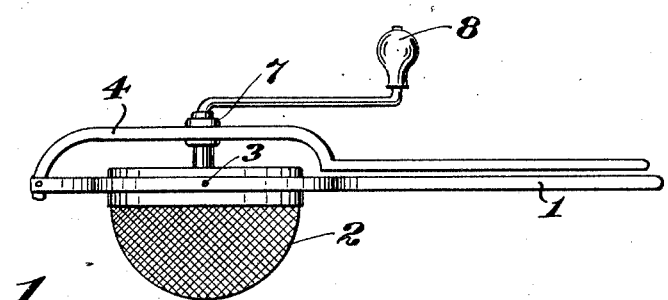
Figure 2:
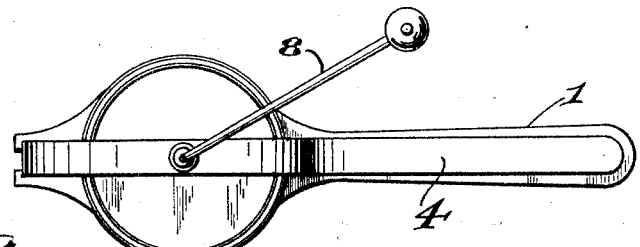
Figure 3:
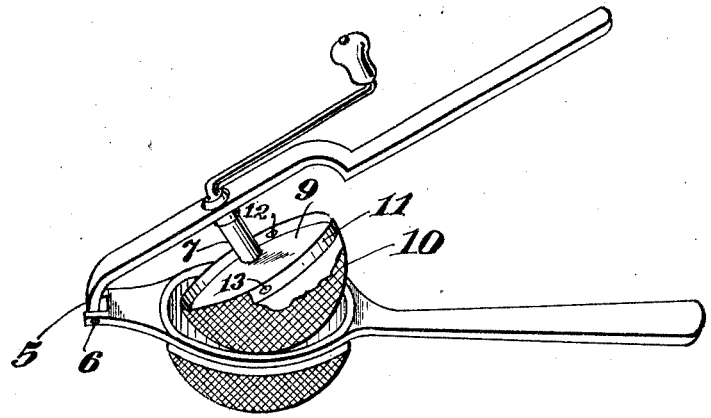

In the drawing which accompanies this application, Fig. 1 is a side view of the device in the closed position; Fig. 2 is a plan view as seen from the top, also in the closed position; and, Fig. 3 is a view of the device in perspective showing the handles partly separated, illustrating the relationship of the grinding element and crank to the other parts. A small part of the surface of the grinder has been illustrated as cut away in the upper right hand corner in order to show the method of securing the wire mesh to the convex surface of the grinder as explained in detail in a later paragraph.

The device consists of an aluminum casting, 1, which is cast in the form of a ring with handle attached. Into the ring portion of the casting is inserted a wire mesh strainer, 2, in the manner shown in Fig. 1, and riveted as at 3, for security. This combination is called the receptacle.

An aluminum casting, 4, is fastened to the receptacle as at 5, by means of a hole drilled through both castings and a pin 6, inserted, in the manner shown in Fig. 3; such clearance being allowed so as to permit of ease of motion between the two castings. A bearing, 7, is provided in the middle of the casting, 4, for the purpose of supporting the shaft of the crank, 8, which is permanently attached to the grinding element, 9, and is intended to rotate same. The grinding element, 9, heretofore referred to, consists of sheet aluminum spun to the form of a half ball, forming a convex surface on one side and a concave surface on the other side. Wire mesh, 10, similar to that used in the construction of the strainer, 2, is stretched tightly, and completely covering the convex surface of the said half ball form; is then folded over the edge of the form toward the concave side of the form and held in position by means of a collar, 11, which is forced downward on the inside of the half ball, in the manner shown in the cut out section of the grinding element, 9, in Fig. 3. The collar, 11, is a forced fit but is also riveted as at 12 and 13 for greater security.

The device is operated by maintaining pressure on both handles with one hand and turning the crank, which operates the convex grinding surface, with the other hand.

I am aware that grinding machines for grinding various substances, other than food, have been made which use the principle of a convex rotating surface operating against a stationary concave surface. I do not, therefore, claim such a combination broadly, but

I claim:

In a food grinding device, the combination of a frame consisting of two members having a hinged connection; a rotative grinding element with a covering of wire mesh constituting its grinding surface and having a shaft and handle attached thereto; means provided for mounting said grinding element on one of said frame members in a plain bearing permitting free and continuous rotation of said grinding element; a wire mesh receptacle, supported by the other of said frame members, said wire mesh receptacle to receive said grinding element and permit of free and continuous rotation of said grinding element therein, substantially as described.

Signed this 5th day of May, 1927.

ARTHUR EDWIN WILLIS.